US007956728B2

(12) United States Patent
Kousaka et al.

(10) Patent No.: US 7,956,728 B2

(45) Date of Patent: *Jun. 7, 2011

(54) SOUND PRODUCTION CONTROLLER

(75) Inventors: Mitsuaki Kousaka, Yokkaichi (JP); Masayuki Kato, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/656,819

(22) Filed: Feb. 17, 2010

(65) Prior Publication Data

US 2010/0207747 A1 Aug. 19, 2010

Related U.S. Application Data

(63) Continuation of application No. 11/593,105, filed on Nov. 6, 2006, now Pat. No. 7,724,127.

(30) Foreign Application Priority Data

Nov. 8, 2005 (JP) ................................ 2005-323578

(51) Int. Cl.

*G08B 3/00* (2006.01)

*B60R 25/10* (2006.01)

(52) U.S. Cl. ............. 340/388.1; 340/384.4; 340/539.11; 340/426.13; 340/426.17

(58) Field of Classification Search ........................ None

See application file for complete search history.

(56) References Cited

U.S. PATENT DOCUMENTS

| | | | | | |
|---|---|---|---|---|---|
| 4,305,070 | A * | 12/1981 | Samuel | 340/691.8 |
| 4,363,028 | A * | 12/1982 | Bosnak | 340/384.72 |
| 5,266,921 | A * | 11/1993 | Wilson | 340/384.5 |
| 5,293,149 | A * | 3/1994 | Wilson et al. | 340/384.73 |
| 5,821,700 | A * | 10/1998 | Malvaso | 315/291 |
| 6,130,605 | A * | 10/2000 | Flick | 340/426.23 |
| 6,650,232 | B1 * | 11/2003 | Strohbeck et al. | 340/384.7 |
| 2002/0079741 | A1 * | 6/2002 | Anderson | 307/64 |
| 2002/0149341 | A1 * | 10/2002 | Tao | 318/798 |
| 2003/0080875 | A1 * | 5/2003 | Wathen | 340/825.72 |
| 2004/0189463 | A1 * | 9/2004 | Wathen | 340/539.1 |
| 2008/0041267 | A1 * | 2/2008 | Denen et al. | 105/1.5 |
| 2008/0258883 | A1 * | 10/2008 | Solow | 340/388.1 |

FOREIGN PATENT DOCUMENTS

| | | |
|---|---|---|
| JP | A-58-145538 | 8/1983 |
| JP | A-59-206567 | 11/1984 |
| JP | U-60-136238 | 9/1985 |
| JP | A-2003-58164 | 2/2003 |
| JP | A-2005-215544 | 8/2005 |

OTHER PUBLICATIONS

Jan. 7, 2010 Office Action for Japanese Patent Application No. 2005-323578 (with translation).

* cited by examiner

*Primary Examiner* — Julie Lieu

(74) *Attorney, Agent, or Firm* — Oliff & Berridge, PLC

(57) ABSTRACT

A sound production controller can include a horn device that performs a vibrating operation at a predetermined resonance frequency in response to a predetermined operation to produce a warning sound, an input section which receives a sound production command signal outputted in response to execution of a function that requires sound production in the vehicle other than the predetermined operation, and a sound production controller which, if the input section receives the sound production command, provides a high-frequency signal having a frequency higher than the predetermined resonance frequency to the horn device to cause the horn device to produce a sound.

10 Claims, 7 Drawing Sheets

SOUND PRODUCTION CONTROLLER

CROSS REFERENCE TO RELATED APPLICATION

This is a Continuation of application Ser. No. 11/593,105 filed Nov. 6, 2006, which claims the benefit of Japanese Patent Application No. 2005-323578 filed Nov. 8, 2005. The disclosures of the prior applications are hereby incorporated by reference herein in their entirety.

TECHNICAL FIELD

The present disclosure relates to a sound production controller provided in a vehicle having a horn device (vehicle horn device).

BACKGROUND

Many vehicles have been equipped with a keyless entry system that allows a driver to remotely instruct a vehicle to lock or unlock the doors of the vehicle as described in Japanese Patent Laid-Open No. 59-206567, for example. With this system, when the driver uses a remote controller to lock or unlock the doors of the vehicle, a horn or beeper provided in the vehicle is sounded to allow the driver to verify that the doors have actually locked or unlocked.

However, the conventional keyless entry system has a problem that because the horn or beeper is specifically provided for producing a sound when keyless entry is performed, the number of components increases.

Thus, there is an need in the art for a sound production controller capable of producing sound when a keyless entry function is executed without the need of a dedicated sound production apparatus.

SUMMARY

According to the present invention, a sound production controller can include a horn device (for example a vehicle horn device) that performs a vibrating operation at a predetermined resonance frequency in response to a predetermined operation (for example a honk operation) to produce a warning sound, an input section which receives a sound production command signal outputted in response to execution of a function that requires sound production in the vehicle other than the predetermined operation, and a sound production controller which, if the input section receives the sound production command, provides a high-frequency signal having a frequency higher than the predetermined resonance frequency to the horn device to cause the horn device to produce a sound.

The term “horn device” as used herein includes a “vehicle horn device” which will be described below as well as a security horn device that performs a vibrating operation at a given resonance frequency to generate a warning sound in response to detection of a certain abnormal state. The term “high-frequency signal” as used herein refers to a signal whose signal level rises and falls periodically, including a PWM signal and an alternating-current signal. The term “vehicle horn device” is not limited to an apparatus that produce a warning sound in response to an alternating-current signal. It may be an apparatus that produces a warning sound in response to a direct-current signal.

For example, the vehicle horn device can be an apparatus that generates a vibration at a predetermined resonance frequency to produce a warning sound when a driver presses a horn button provided on the steeling wheel. Accordingly, a high-frequency signal with a frequency higher than the predetermined resonance frequency is provided to the vehicle horn device to cause it to produce a sound having a sound quality (such as a pitch) that differs from that of the original sound (warning sound). Thus, the vehicle horn device can be used to produce a sound with a different sound quality in response to an operation different from a horn button depression that is distinguishable from the warning sound produced when the horn button is pressed without a dedicated sound device. The term horn device includes a security horn device that produces a warning sound in response to detection of an abnormal state by an abnormality detector provided in a vehicle, as well as an ordinary vehicle horn device. Any of the configurations according to claims 3 to 7 that are appended can be applied to the security horn device.

Also, the vehicle horn device can include a coil and a contact connected with each other in series and the contact repeatedly opens and closes at the predetermined resonance frequency by receiving a predetermined direct-current signal in response to the honk operation to cause the vehicle horn device to perform a vibrating operation to produce warning sound, the sound production controller includes a switching element provided between a power supply and the vehicle horn device, and a PWM signal generating section which generates a PWM signal that turns on and off the switching element. If the input section receives the sound production command signal, the sound production controller turns on and off the switching element on the basis of the PWM signal to provide a high-frequency signal to the coil and contact at a level capable of holding the contact closed to cause the vehicle horn device to perform a vibrating operation in accordance with the duty ratio of the PWM signal.

BRIEF DESCRIPTION OF THE DRAWINGS

Illustrative aspects in accordance with the invention will be described in detail with reference to the following figures wherein.

DETAILED DESCRIPTION

First Illustrative Aspect

A first illustrative aspect of the present invention will be described with reference to FIGS. 1 to 4.

Figure 1:
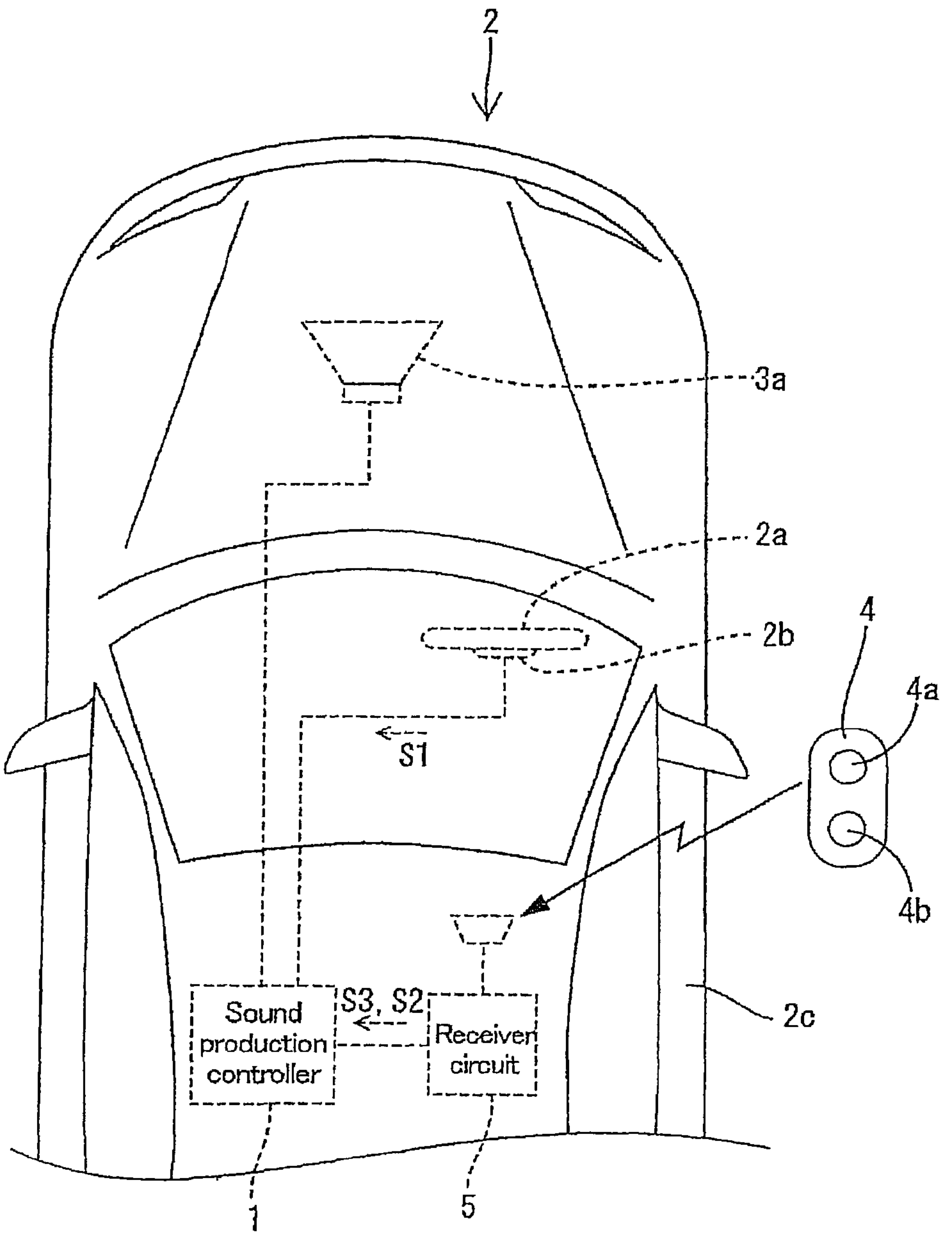
FIG. 1 is a schematic diagram partially showing a vehicle according to a first illustrative aspect of the present invention.

FIG. 1 is a schematic diagram partially showing a vehicle 2 in which a sound production controller 1 according to a first illustrative aspect is provided. In the vehicle 2, a warning sound can be sounded from a vehicle horn device 3 equipped with a horn 3*a* by pressing, for example, a horn button 2*b* provided on a steering wheel 2*a* held by the driver (this operation is an example of a “honk operation” as used herein).

The vehicle 2 further includes a so-called keyless entry system that allows a driver to instruct the vehicle 2 to lock or unlock the doors 2*c* from a location remote from the vehicle 2. The keyless entry function implemented by the keyless entry system is one example of a "function that requires sound production that differs from the honk operation" according to the present invention. According to the first illustrative aspect, the horn 3*a* is provided in the vehicle horn device 3 to produce a sound that verifies lock and unlock when the keyless entry function is executed.

1. Configuration of the Keyless Entry System

The keyless entry system includes a transmitter 4 (remote controller) for remotely controlling the vehicle 2 to lock and unlock the door from outside the vehicle 2. The transmitter 4 includes a lock button 4*a* and an unlock button 4*b*, for example. When the lock button 4*a* is pressed, the transmitter 4 transmits a modulating signal (lock signal S2) that instructs the vehicle 2 to lock the door 2*c*. When the unlock button 4*b* is pressed, the transmitter 4 transmits a modulating signal (unlock signal S3) that instructs the vehicle 2 to unlock the door 2*c*. The keyless entry system also includes a receiver 5 that receives signals S2, S3 transmitted from the transmitter 4 and drives a lock mechanism (not shown) in the vehicle 2, and a sound production controller 1. The vehicle horn device 3, the receiver 5, and the sound production controller 1 operate on a battery (+B) provided in the vehicle 2.

Figure 2:
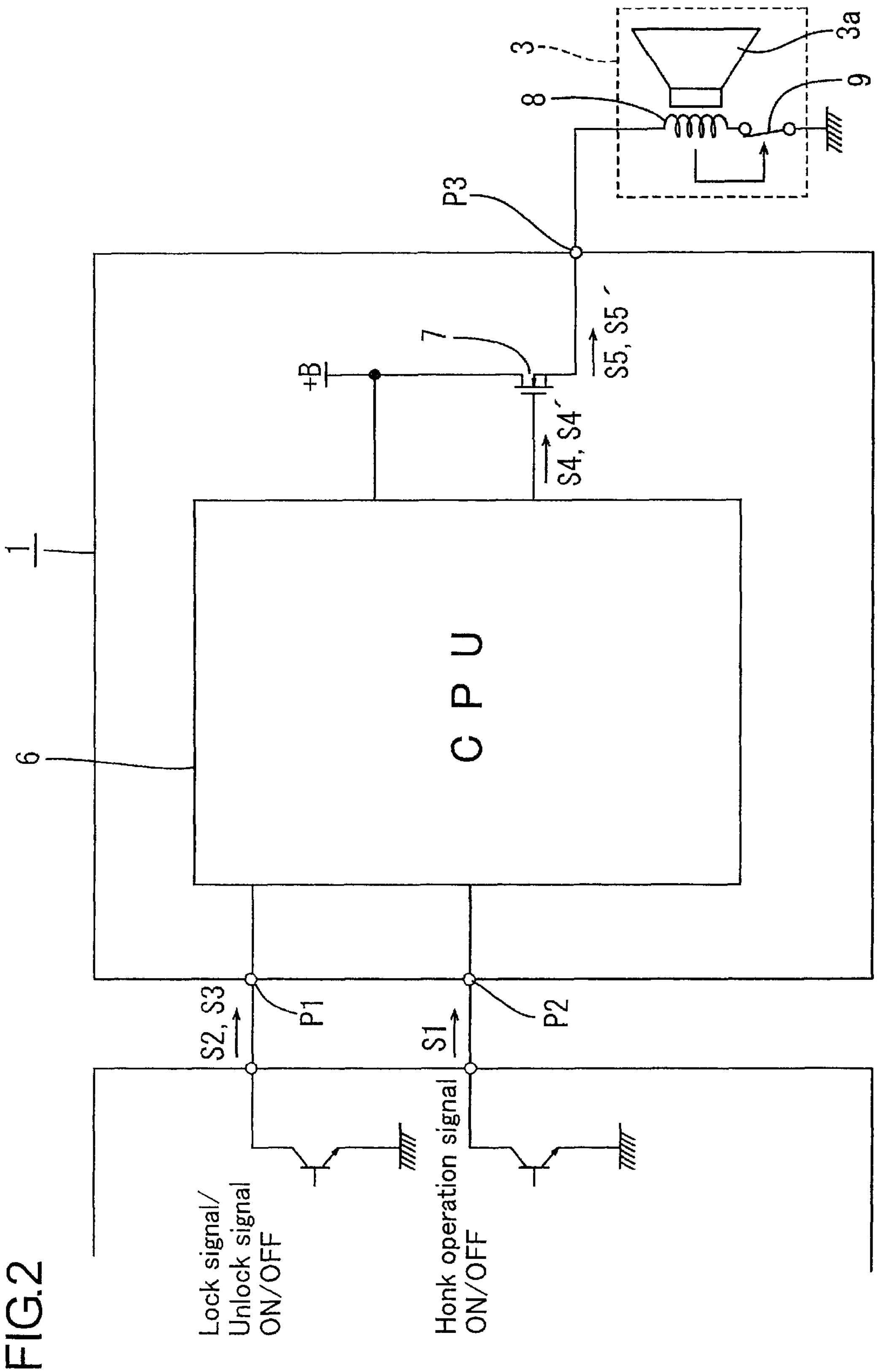
FIG. 2 is a circuit diagram of a sound production controller and a vehicle horn device.

FIG. 2 is a circuit diagram primarily showing the sound production controller 1 and the vehicle horn device 3. The sound production controller 1 has a first input terminal P1 to which a honk operation signal S1 (low level) outputted in response to depression of the horn button 2*b* is inputted and a second input terminal P2 to which a lock signal S2 or unlock signal S3 outputted from the receiver 5 on reception of the lock signal S2 or unlock signal S3 from the transmitter 4 is inputted. The lock signal S2 (low level) and the unlock signal S3 (low level) outputted from the receiver 5 are examples of a "sound production command signal" and a "command signal outputted in response to lock or unlock of the door" according to the present invention. The first and second input terminals P1 and P2 are examples of an "input section" according to the present invention.

The sound production apparatus 1 includes a CPU 6 which receives signals S1-S3 provided to the first and second input terminals P1 and P2 and a switching element (a power MOSFET 7 in the first illustrative aspect) that turns on and off to supply power control to the vehicle horn device 3 connected to the battery in accordance with PWM (Pulse Width Modulation) signals (hereinafter a signal whose duty ratio is set to a value greater than 0% and less than 100% is referred to as "PWM signal S4" and a signal whose duty ratio is set to either 0% or 100% is referred to as "PWM signal S4'") from the CPU 6. The power MOSFET 7 is provided on the connection line between the battery and an external connection terminal P3. More specifically, the power MOSFET 7 has a gate which functions as a control terminal connected to the CPU 6, a drain connected to the battery, and a source connected to the external connection terminal P3.

The vehicle horn device 3 includes a coil 8 and a contact 9 connected to each other in series between the external connection terminal P3 and a ground line, and a horn 3*a*. The contact 9 of the vehicle horn device 3 is normally closed (when it is disconnected from the power MOSFET 7 and therefore is not supplied with power). When a PWM signal S4' whose duty ratio is set to 0% or 100% is outputted from the CPU 6 to turn on the power MOSFET 7, a direct-current signal S5' at a predetermined level is provided to the vehicle horn device 3 through the poser MOSFET 7. When the vehicle horn device 3 receives the direct-current signal S5' at the predetermined level, a force depending on the electromotive force of the coil 8 is exerted on the vibrating part of the horn 3*a*. The force causes the vibrating part to move against the energizing force acting in the direction that closes the contact 9 to a certain point, where the vibrating part presses the contact 9 to open the contact 9. This prevents current from flowing through the coil 8. Consequently, no current flows in the coil 8 and the vibrating part returns to the original position and the contact 9 opens again. The contact 9 of the vehicle horn device 3 repeatedly opens and closes at a predetermined resonance frequency f1 in response to the direct-current signal S5' at the predetermined level. With the repetition of this switching, the vibrating part of the horn 3*a* vibrates and produces a warning sound.

The predetermined resonance frequency f1 is determined by the mass of the vibrating part and the compliance of a suspension such as an edge and damper that supports the vibrating part. The resonance frequency f1 is typically a frequency (typically 300-500 Hz) corresponding to the rated impedance of the coil 8.

Figure 3:
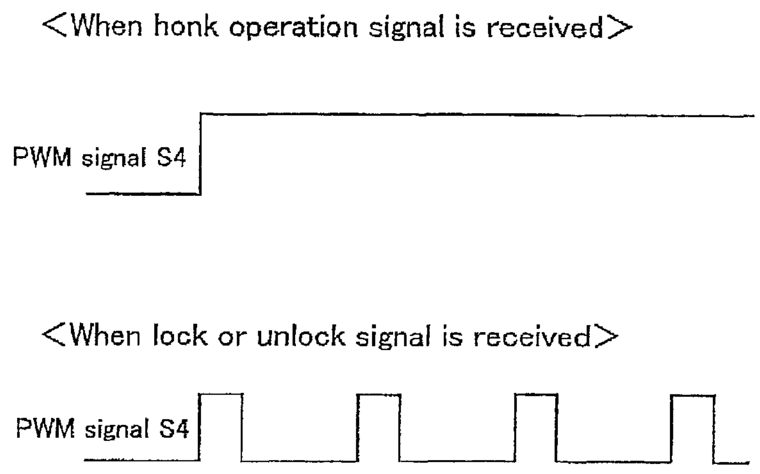
FIG. 3 shows timing charts of a direct current signal and a PWM signal.

When receiving a honk operation signal S1, the CPU 6 provides PWM signal S4' (signal at a constant level) whose duty ratio is set to either 0% or 100% to the gate of the power MOSFET 7 as shown in FIG. 3 to turn on the power MOSFET 7 and hold it turned on (in the energized state). This supplies the vehicle horn device 3 with a direct-current signal S5' at a constant level. On the other hand, when receiving a lock signal S2 or an unlock signal S3, the CPU 6 provides PWM signal S4 whose duty ratio is set to a value greater than 0% and less than 100% (on/off signal that repeatedly turns on and off on a periodic basis at a frequency higher than the resonance frequency f1) to the gate of the power MOSFET 7 to cause the power MOSFET 7 to turn on and off (be energized and de-energized). This supplies the vehicle horn device 3 with a high-frequency signal S5 related to the frequency of PWM signal P4. Thus, the CPU 6 functions as a "sound production controller" and a "PWM signal generator".

Figure 4:
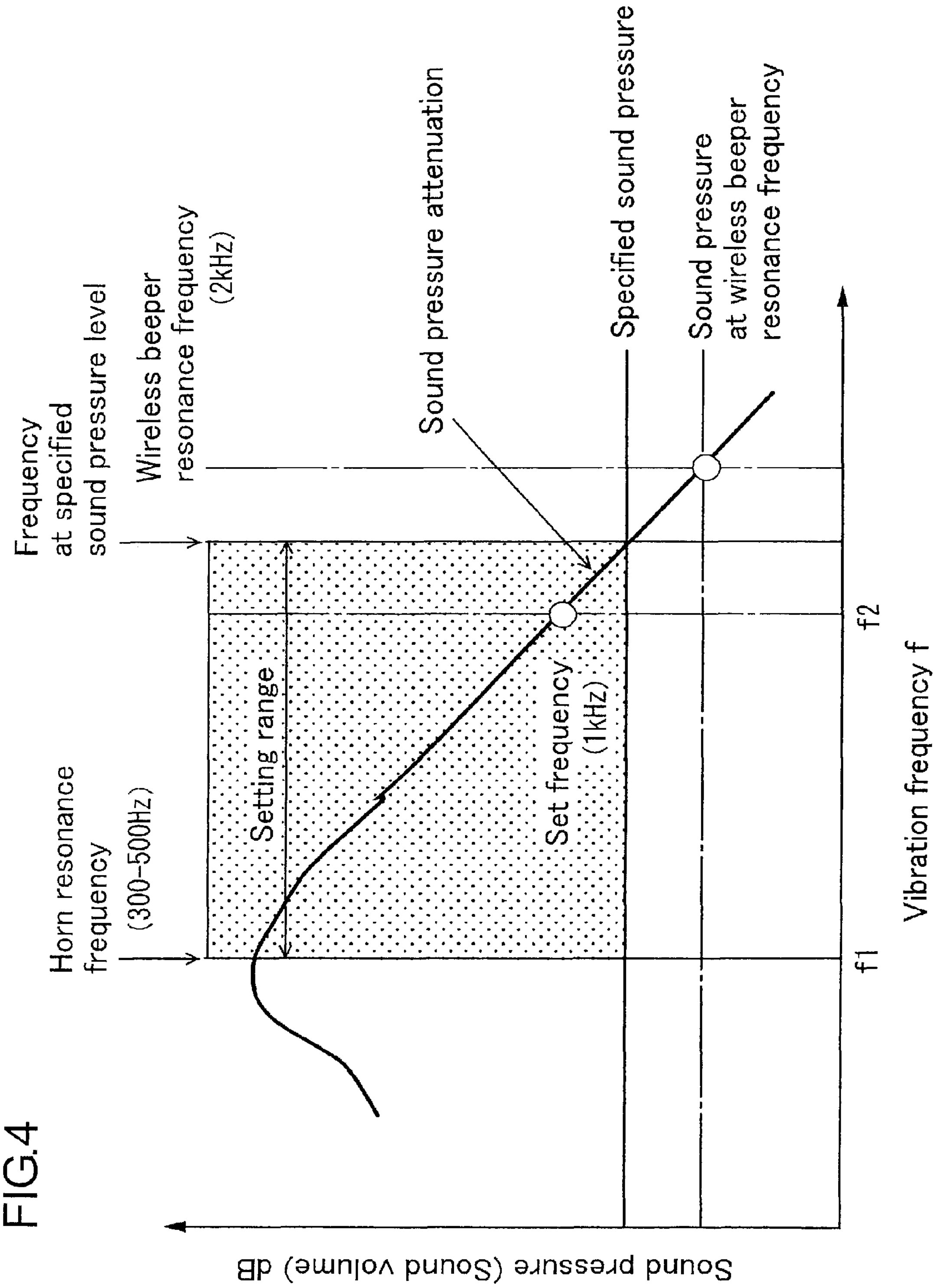
FIG. 4 is a graph of the frequency of a vibration of a vibrating section of a horn versus the sound volume (sound pressure level)

FIG. 4 is a graph of the frequency of vibration of the vibrating part of the horn 3*a* of the vehicle horn device 3 versus sound volume (sound pressure). As shown in FIG. 4, when the vehicle horn device 3 receives a direct-current signal S5' at the predetermined level, the vibrating part vibrates with the utmost efficiency and produces a warning sound with the maximum sound volume at the resonance frequency f1.

On the other hand, when the vibrating part vibrates at a frequency higher than the resonance frequency f1, the vehicle horn device 3 produces a sound with a higher frequency and smaller sound volume than those of the warning sound. In order to make the verification sound, produced on execution of a keyless entry function, distinguishable from the warning sound produced when a honk operation is performed, it is desirable that the frequency of the vibration of the vibrating part created when the keyless entry function is performed be set to a value significantly higher than the resonance frequency f1. However, the volume of sound produced by the vehicle horn device 3 decreases with increasing frequency as shown in FIG. 4. Typically, a value is specified for the volume of sound produced when a keyless entry function is executed (the "specified sound pressure" in FIG. 4) and the sound volume is adjusted so as to meet the specified value.

Therefore, in the first illustrative aspect, a PWM signal S4 whose frequency is set to 1 kHz and whose duty ratio is set to 20% is outputted when a keyless entry function is executed. In conventional systems which use a dedicated sound generator (such as a wireless beeper), rather than using a vehicle horn device 3, to produce a verification sound when keyless entry is performed, the wireless beeper is vibrated with a resonance frequency of 2 kHz and a duty ratio of 50%.

When the CPU 6 receives both of the honk operation signal S1 and either a lock signal S2 or unlock signal S3 at a time, the CPU 6 selects the honk operation signal S1 in preference to the lock or unlock signal S2, S3 and provides the direct-current signal S5' to the vehicle horn device 3.

2. Effects According to the Illustrative Aspect (1) According to the first illustrative aspect, when a honk operation is performed, a honk operation signal S1 is provided to the CPU 6 of the sound production controller 1 and a PWM signal S4', whose duty ratio is set to 0% or 100%, is provided from the CPU 6 to the power MOSFET 7 to hold the power MOSFET 7 energized. Consequently, the vehicle horn device 3 receives a predetermined direct-current signal S5', which vibrates the vibrating part of the horn 3*a* at the resonance frequency f1 to produce a warning sound. On the other hand, when a keyless entry function is executed, a lock signal S2 or an unlock signal S3 is provided to the CPU 6 of the sound production controller 1, a PWM signal S4 with the set frequency f2 (of 1 $kH_z$ in the first illustrative aspect) and duty ratio of 20% is provided to the power MOSFET 7 from the CPU 6, and on/off operation is repeated accordingly. Although the vehicle horn device 3 receives a high-frequency signal S5 with a frequency related to the 20%-duty ratio, an electromotive force that is sufficient for opening the contact 9 is not generated in the coil 8, and therefore the vibrating part of the horn 3*a* vibrates in accordance with a set frequency f2 of the PWM signal S4 while the contact 9 is closed and in the energized state. Because the set frequency f2 is higher than the resonance frequency f1, a verification sound with a frequency higher than that of the warning sound can be produced when keyless entry is performed.

(2) In addition, because the sound production controller 1 provides the PWM signal S4 to the vehicle horn device 3 to cause it to produce a sound when a keyless entry operation is performed, the sound pressure can be readily adjusted so as to meet a specified value simply by changing the duty ratio of the PWM signal S4.

Second Illustrative Aspect

Figure 5:
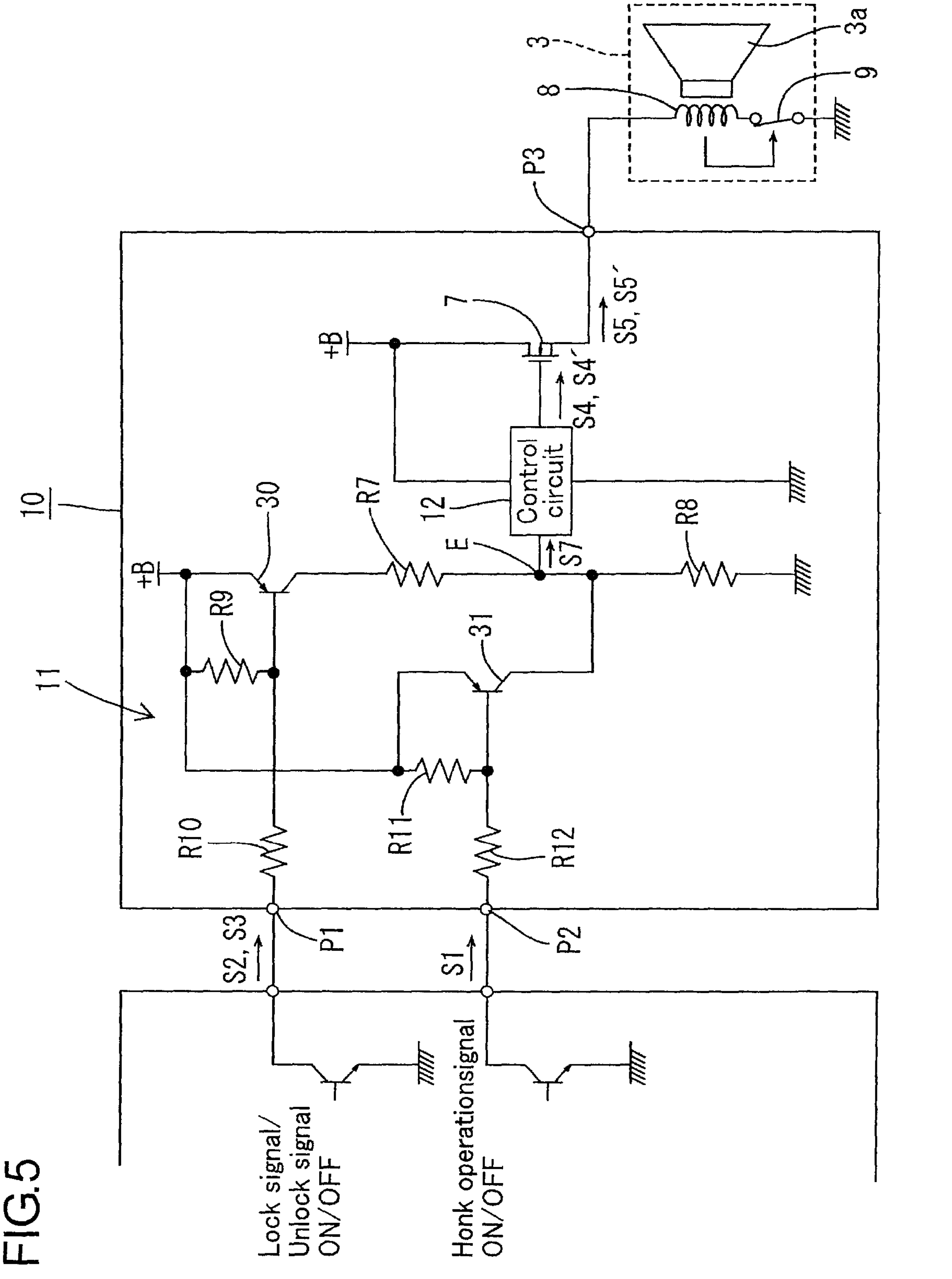
FIG. 5 is a circuit diagram of a sound production controller and a vehicle horn device according to a second illustrative aspect of the present invention.
Figure 6:
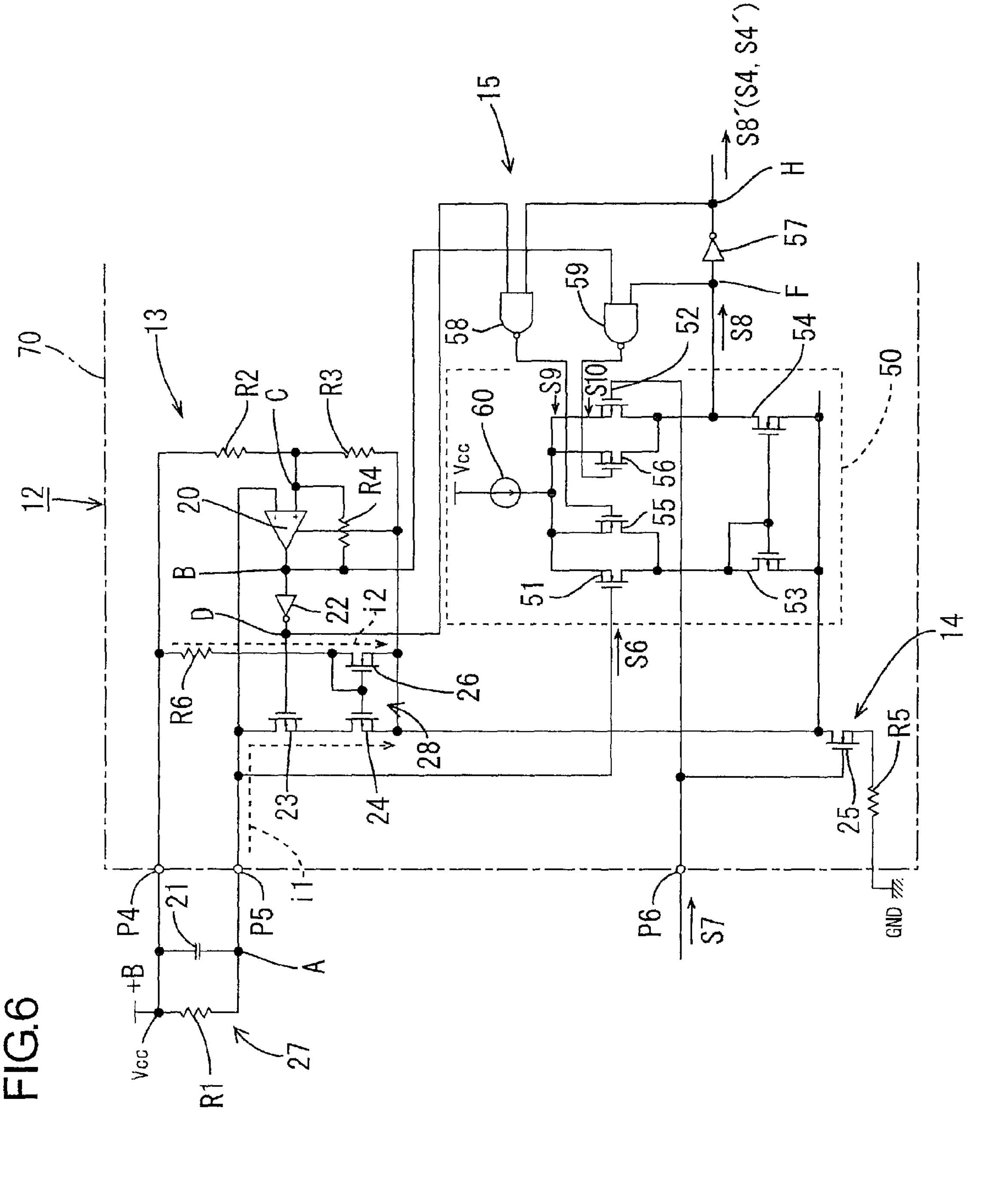
FIG. 6 is a block diagram of a control circuit.
Figure 7:
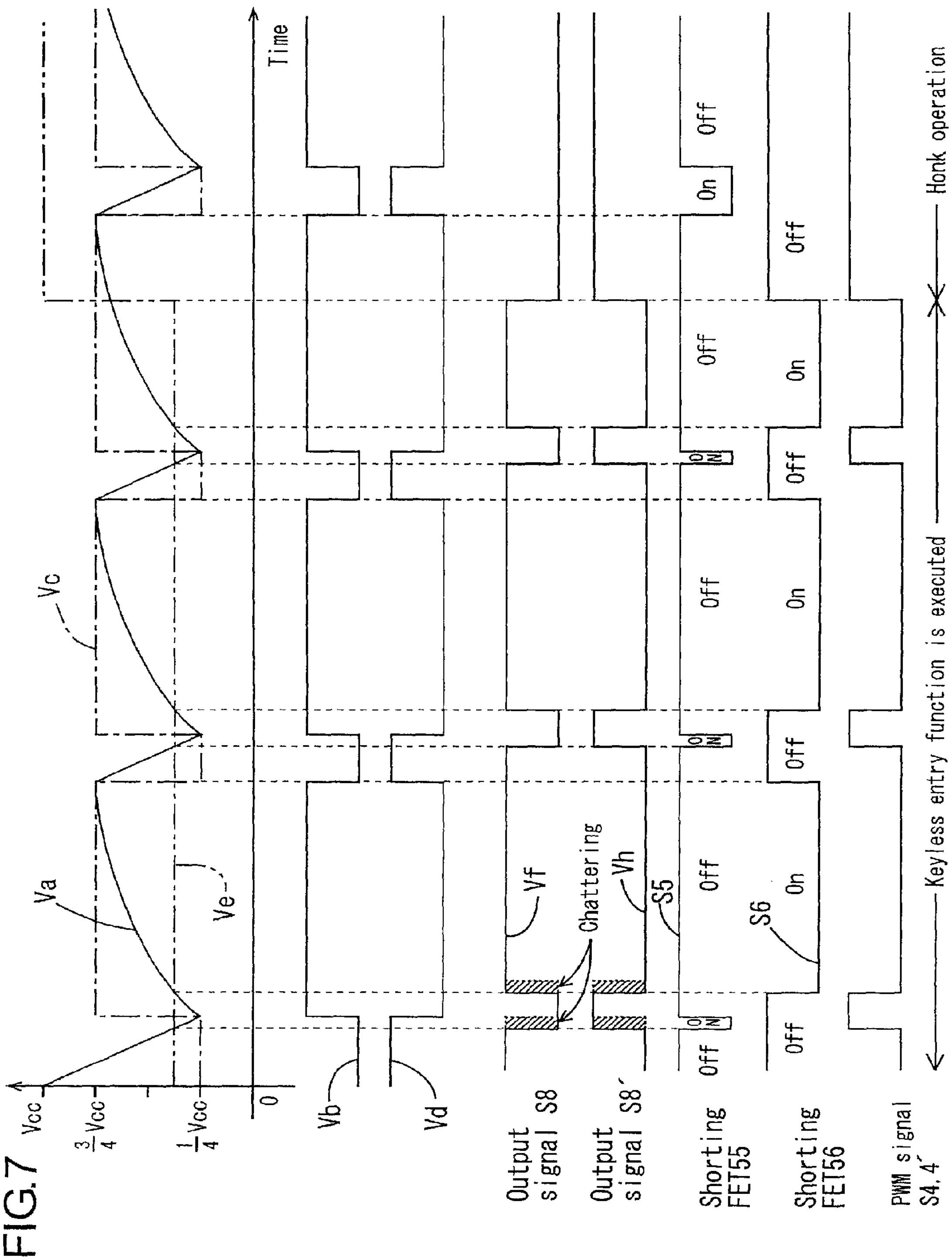
FIG. 7 shows timing charts showing the voltage levels of an oscillation signal and a reference signal at each point.

FIGS. 5 to 7 show a second illustrative aspect of the present invention. The second illustrative aspects is the same as the first illustrative aspect except for the configuration of the sound production controller. Therefore, the same elements as those in the first illustrative aspect are labeled with the same reference numerals or symbols and overlapping description is omitted. In the following description, only the differences from the first illustrative aspect will be described.

The sound production controller 1 in the first illustrative aspect contains a CPU 6 that functions as a sound production controller. A sound production controller 10 according to the second illustrative aspect in contrast includes, in stead of the CPU 6, a reference signal setting circuit 11 which receives signals S1-S3 from a first input terminal P1 and a second input terminal P2 and a control circuit 12 (an example of the “sound production controller”) which provides PWM signals S4 and S4' described above to a power MOSFET 7, as shown in FIG. 5.

1. Configuration of the Control Circuit

FIG. 6 shows a configuration of the control circuit 12. As shown, the control circuit 12 can include a frequency control circuit 13 which is an oscillation circuit outputting an oscillation signal S6, a leakage current cutoff circuit 14, and a duty ratio control circuit 15 which is a comparator circuit.

(1) Frequency Control Circuit

The frequency control circuit 13 includes a comparator 20 (which may be an operational amplifier). The negative input terminal of the comparator 20 is connected to the high-potential (Vcc) terminal of a battery (+B) through a parallel circuit 27 consisting of a capacitor 21 and a resistor R1. That is, a voltage signal at a level that depends on the terminal voltage of the capacitor 21 is provided to the negative input terminal of the comparator 20. Hereinafter the voltage level at point A coupled to the negative input terminal of the comparator 20 is denoted by Va. A signal corresponding to the voltage level Va at point A is provided to the duty ratio control circuit 15 as an oscillation signal S6.

On the other hand, provided to the positive input terminal of the comparator 20 is a divided voltage from a voltage divider circuit consisting of voltage dividing resistors R2 and R3 connected in series between the high potential terminal of and low potential (GND) terminal of the battery. An output B from the comparator 20 is positively fed back to the positive input terminal of the comparator 20 through a feedback resistor R4. That is, a voltage signal at a level that depends on the resistance values of the voltage dividing resistors R2 and R3 and feedback resistor R4 is provided to the positive input terminal of the comparator 20. The voltage level at point C coupled to the positive input terminal of the comparator 20 is denoted by Vc.

Then, the output from the comparator 20 is provided to a NOT circuit 22. The low potential side of the parallel circuit 27 is connected to the low potential terminal of the battery through three n-channel FETs 23, 24, and 25 and a resistor R5 connected in series. A voltage signal from the output point D of the NOT circuit 22 is provided to the gate of the FET 23 on the high-potential side.

FET 24 and an n-channel FET 26 whose gate and drain are shorted together constitute a current mirror circuit 28. The drain of FET 26 is connected to the high potential terminal of the battery through a resistor R6 acting as a resistance element.

(2) Duty Ratio Control Circuit

The duty ratio control circuit 15 includes a comparator 50. The comparator 50 has a first p-channel current control FET 51 which is a first current control element coupled to the positive input terminal of the comparator 50 and turning on and off in response to an oscillation signal S6 and a second p-channel current control FET 52 which is a second current control element coupled to the negative input terminal of the comparator 50 and turning on and off in response to a reference signal S7 from the reference signal setting circuit 11.

The first current control FET 51 has a source connected to a constant current source 60 and a drain connected to the connection point between the FET 24 and FET 25 through an n-channel FET 53. The second current control FET 52 has a source connected also to the constant current source 60 and a drain connected to the connection point between the FET 24 and FET 25 through an n-channel FET 54. The FET 53 has a gate and drain shorted together, and forms a current mirror circuit with the FET 54.

The comparator 50 provides an output signal S8 whose level is inverted depending on which of the oscillation signal S6 level and the reference signal S7 level is greater than a NOT circuit 57, which in turn outputs a level-inverted output signal S8' as PWM signals S4, S4'. Hereinafter, the voltage level at output point F of the comparator 50 is denoted by Vf and the voltage level at the output point H of the NOT circuit 57 is denoted by Vh.

In the second illustrative aspect, connected in parallel to the first current control FET 51 is a first p-channel shorting FET 55 as a first shorting switching element. The first shorting FET 55 performs the function of short-circuiting the source-drain of the first current control FET 51 by turning on when the gate receives a low-level control signal S9. Connected in parallel to the second current control FET 52 is a second p-channel shorting FET 56 as a second shorting switch element. The second shorting FET 56 performs the function of short-circuiting the source-drain of the second current control FET 52 by turning on when the gate also receives a low-level control signal S10.

The control circuit 12 includes a pair of NAND circuits 58, 59. Provided to the input of the NAND circuit 58 are a voltage level Vd from the output point D of the NOT circuit 22 and a voltage level Vh from the output point H of the NOT circuit 57. The output from the NAND circuit 58 is provided to the gate of the first shorting FET 55. On the other hand, the NAND circuit 59 receives at is input a voltage level Vb at the output point B of the comparator 20 and a voltage level Vf at the input point F of the NOT circuit 57. The output from the NAND circuit 59 is provided to the gate of the second shorting FET 56.

The configuration of the control circuit 12 is as described above. In the second illustrative aspect, the power MOSFET 7 and the control circuit 12 (excluding the capacitor 21 and resistor R1, which are frequency determining elements) are fabricated on a single chip or multiple chips in one package to form a semiconductor switching element 70. More specifically, one end of the parallel circuit 27 is connected to the high-potential side of each of resistors R2 and R6 through an external terminal P4 and the other end is connected to the negative input terminal of the comparator 20 through an external terminal P5. The connection point E between voltage dividing resistors R7 and R8 at the output end of the reference signal setting circuit 11 is connected to the gate of FET 25 of a duty ratio control circuit 15 through an external terminal P6.

2. Reference Signal Setting Circuit

As shown in FIG. 5, the reference signal setting circuit 11 has a pair of pnp-transistors 30, 31. The emitter of transistor 30 is connected to the high-potential terminal of the battery and the collector is connected to the low-potential terminal of the battery through a pair of voltage dividing resistors R7, R8. The emitter and base of transistor 30 are connected through a resistor R9, and the base is connected to a first input terminal P1 through a resistor R10.

The emitter of transistor 31 is connected to the high-potential terminal of the battery and the collector is connected to the connection point E between the voltage dividing resistors R7 and R8. The emitter and base of transistor 31 are connected through a resistor R11 and the base is connected to a second input terminal R2 through a resistor R12. A signal that depends on the voltage level Ve at the connection point E is provided to a duty ratio control circuit 15 as a reference signal S7. The signal depending on the voltage level Ve at the connection point E is also provided to the gate of the FET 25.

Transistor 31 turns on in response to a low-level honk operation signal S1 to cause the reference signal setting circuit 11 to provide a reference signal S7 at a level approximately equal to the battery voltage (Vcc) level to the external terminal P6 of the control circuit 12. Transistor 30 on the other hand turns on in response to a low-level lock signal S2 or unlock signal S3 to cause the reference signal setting circuit 11 to provide a reference signal S7 at a level equal to the battery voltage (Vcc) divided by resistors R7 and R8 to the external terminal P6 of the control circuit 12. FET 25 turns on when one of transistors 30 and 31 is turned on and FET 25 turns off when both transistors 30 and 31 are turned off. That is, FET 25 prohibits leakage current by entering and staying in the off state except when a honk operation or keyless entry function is performed.

3. Operation According to the Illustrative Aspect (1) Frequency Control Circuit

When the sound production controller 10 is powered on and a honk operation signal S1 or a lock signal S2 or an unlock signal S3 is inputted in the reference signal setting circuit 11, FET 25 is turned on. Initially, point A coupled to the negative input terminal of the comparator 20 is connected to the voltage Vcc of the high-potential terminal of the battery and the comparator 20 is in the off state, that is, the voltage Vb at the output point B of the comparator 20 is low. Accordingly, the high-level voltage signal Vd from the NOT circuit 22 turns on FET 23, and a current flows from the battery to the parallel circuit 27 to FETs 23, 24, and 25 and the resistor R5, and charging of the capacitor 21 is started.

Because FETs 24 and 26 form the current mirror circuit 28 as has been described earlier, the amount of current i1 flowing in FETs 23 and 24 depends on the amount of current i2 flowing in resistor 6 and FET 26, namely the high potential Vcc of the battery. Therefore, when the high potential Vcc of the battery drops due to a variation in the supply voltage for example, the amount of the charge current i1 provided to the capacitor 21 decreases accordingly. On the other hand, when the high potential Vcc of the battery rises, the amount of the charge current i1 to the capacitor 21 increases accordingly. Consequently, the charging time of the capacitor 21, that is, the frequency of the oscillation signal S6 at point A, is not affected by variations in the high potential Vcc of the battery and therefore can be stabilized. It should be noted that the frequency of the oscillation signal S6 can be set to the set frequency f2 mentioned above by adjusting the circuit constants of the external parallel circuit 27.

The voltage level Vb at the output point B of the comparator 20 is approximately equal to the low potential GND of the battery. In the second illustrative aspect, the voltage dividing resistors R2 and R3 have an identical resistance value and the feedback resistor R4 is set to one half of the resistance value of the voltage dividing resistor R2 (R3). Accordingly, the voltage level Vc at point C is the ¼ of Vcc as shown in FIG. 7 (the timing chart at the top), which is provided to the positive input terminal of the comparator 20.

As the capacitor 21 is charged, the voltage level Va at point A gradually decreases. When the voltage level Va drops below the ¼ of Vcc, the voltage level Vb at the output point B of the comparator 20 is inverted to the high level (see the second timing chart from the top of FIG. 7). As a result, FET 23 turns off and the charging of the capacitor 21 stops and discharging is started. At this point in time, the voltage level Vb at the output point B of the comparator 20 is approximately equal to the high potential Vcc of the battery. Accordingly, the voltage level Vc at point C becomes the ¾ of Vcc as shown in FIG. 7 (the timing chart at the top), which is provided to the positive input terminal of the comparator 20.

Then, as the capacitor 21 is discharged, the voltage level Va at point A gradually rises. When the voltage level Va exceeds the ¾ of Vcc, the comparator 20 turns off again (see the second timing chart from the top of FIG. 7) and the voltage level Vb at the output point B is inverted to the low level. In this way, the voltage level Va at point A changes between the ¼ of Vcc and the ¾ of Vcc in triangular waveform and is provided as an oscillation signal S6 to the positive input terminal of the comparator 50 (the gate of the first current control FET 51) of the duty ratio control circuit 15.

(2) Duty Ratio Control Circuit

The oscillation signal S6 from the frequency control circuit 13 is inputted to the positive input terminal of the comparator 50 of the duty ratio control circuit 15 and the voltage level Ve (reference signal S7) at connection point E provided from the reference signal setting circuit 11 is provided to the negative input terminal. In the second illustrative aspect, the resistance values of resistors R7 and R8 can be set such that the voltage level Ve at connection point E has a value (between the ¼ of Vcc and the ¾ of Vcc and closer to the ¼ of Vcc) as shown in FIG. 7 (the timing chart at the top) when a keyless entry function is performed and a lock signal S2 or unlock signal S3 is provided to the reference signal setting circuit 11. More specifically, they can be set such that an output signal S8' from the control circuit 12 becomes a PWM signal S4 whose duty ratio is set to 20% for example.

When the level of the oscillation signal S6 exceeds the voltage level Ve at connection point E, the first current control FET 51 of the comparator 50 is turned off and the voltage level Vf at the output point F of the comparator 50 goes high. On the other hand, when the level of the oscillation signal S6 drops below the voltage level Ve at connection point E, the first current control FET 51 turns on and the voltage level Vf at the output point F of the comparator 50 goes low. As a result, the waveform of the voltage level Vf at the output point F of the comparator 50 becomes a rectangular pulse waveform as shown in FIG. 7 (the fourth timing chart from the top).

The level of the reference signal S7 (the voltage level Ve at connect ion point) provided from the reference signal setting circuit 11 can vary, for example, due to noise generated in the vehicle 2. As a result, chattering may occur when the voltage changes between the oscillation signal S6 level and the reference signal S7 level (see the fourth and fifth timing charts from the top of FIG. 7), the chattering may changes the duty ratio of the PWM signal S4, and the change in the duty ratio may result in distortion of the verification sound produced when a keyless entry function is performed.

Therefore, in the second illustrative aspect of the present invention, the first and second shorting FETs 55 and 56 are provided in the comparator 50 as mentioned earlier. The first shorting FET 55 turns on in response to a low-level signal from the NAND circuit 58 when both of the voltage level Vd at the output D of the NOT circuit 22 and the voltage level Vh at the output point H of the NOT circuit 57 are high. Otherwise, the first shorting FET 55 is turned off in response to a high-level signal. That is, the first shorting FET 55 is in the on state (performing short-circuiting) in the period from the point at which the oscillation signal S6 level drops below the reference signal S7 level to the time at which the pattern of change in the level of the oscillation signal S6 is inverted (turns from drop to rise) as shown in FIG. 7 (the sixth timing chart from the top). In the other periods, the first shorting FET 55 is in the off state (non-shorting state).

Thus, when the oscillation signal S6 level drops below the reference signal S7 level, the first shorting FET 55 short-circuits the drain-source of the first current control FET 51 on the positive input terminal side. A larger current flows into FET 54 which forms a current mirror circuit with FET 53 coupled to the first current control FET 51. Accordingly, the voltage level Vf at the output point F of the comparator 50 is forced and held low and level inversion can be prevented even if a variation occurs in the reference signal level S7. During the charging of the capacitor 21, the voltage level Va at point A drops and the amount of current flowing into the first current control FET 51 is increasing, then the current flowing in the first current control FET 51 (current according with the level of the oscillation signal S2) flows in FETs 53 and 54. When the first shorting FET 55 is turned on, a current larger than the current that has been flowing in the first current control FET 51, while the first shorting FET 55 was in the off state, flows in the FETs 53 and 43. This means that the level to be compared with the level of the reference signal S3 in the comparator 50 is changed to a level that is not inverted by the voltage level Vf at the output point F regardless of the level of the oscillation signal S2.

On the other hand, the second shorting FET 56 turns on in response to a low-level signal from the NAND circuit 59 when both of the voltage level Vb at the output point B of the comparator 20 and the voltage level Vf at the input point F of the NOT circuit 57 are high and otherwise turns off in response to a high-level signal. That is, the second shorting FET 56 is in the on state (performing short-circuiting) in the period from the time point at which the oscillation signal S6 level exceeds the reference signal level S7 to the time point at which the pattern of change in the level of the oscillation signal S6 is inverted (turns from rise to drop), as shown in FIG. 7 (the seventh timing chart from the top). In the other periods, the second shorting FET 56 is in the off state (non-shorting state).

Thus, when the level of the oscillation signal S6 exceeds the level of the reference signal S7, the second shorting FET 56 short-circuits the drain-source of the second current control FET 52 on the negative input terminal side. Therefore, the voltage level Vf at the output point F of the comparator 50 is forced and held high and level inversion can be prevented even if a variation occurs in the reference signal level S7. During the discharging of the capacitor 21, the voltage level Va at point A rises and the amount of current flowing in the first current control FET 51 is decreasing, whereas a current related to the level of the reference signal S3 is flowing in the second current control FET 52. When the second shorting FET 56 is turned on, a current larger than the current that has been flowing in the second current control FET 52, while the second shorting FET 56 was in the off state, flows through the second shorting FET 56. This means that the level to be compared with the level of the oscillation signal S2 in the comparator 50 is changed to a level that is not inverted by the voltage level Vf at the output point F regardless of the level of the reference signal S3. Thus, the NAND circuits 58 and 59 function as an "increase-decrease inversion detecting means" and a "short-circuiting controller" and constitute a "level inversion inhibiting section" together with the first and second shorting FETs 55 and 56.

(3) Reference Signal Setting Circuit and Leakage Current Cutoff Circuit

The operation performed when keyless entry function is executed has been described above. When a honk operation is performed, a honk operation signal S1 is provided to the reference signal setting circuit 11 to turn on the transistor 31. As a result, the level of the reference signal S7 (the voltage level Ve at connection point E) becomes approximately equal to the high potential Vcc of the battery, as shown in the right side (the uppermost time chart) of FIG. 7. Accordingly, the level of the reference signal S7 always exceeds the level of the oscillation signal S6, a PWM signal S4' whose duty ratio is set to 100% is provided to the power MOSFET 7, and the vehicle horn device 3 produces a warning sound at the resonance frequency f1.

In the second illustrative aspect, when a horn operation signal S1 and a lock signal S2 or unlock signal S3 are provided to the reference signal setting circuit 11 at a time, the transistor 31 turns on so that a reference signal S7 at a level approximately equal to the high potential Vcc of the battery is always provided to the control circuit 12. Accordingly, when a honk operation and a keyless entry function are performed at the same time, a PWM signal S4' whose duty ratio is set to 100% is outputted from the control circuit 12 to cause the vehicle horn device 3 to produce a warning sound. Thus, the honk operation which is more important than the keyless entry is given priority.

As has been described above, according to the second illustrative aspect, the vehicle horn device 3 can be caused to produce a warning sound in response to a honk operation and can be caused to produce a verification sound with a higher frequency than the warning sound in response to execution of a keyless entry function simply by changing the reference signal level S7 which is provided to the control circuit 12.

Other Illustrative Aspects

The present invention is not limited to the illustrative aspects described above with reference to the drawings. For example, the following illustrative aspects also fall within the technical scope of the present invention and other various modifications can be made without departing from the spirit of the present invention.

(1) The sound production controller 1 in the first illustrative aspect may output a PWM signal with a frequency that varies depending on which of a lock signal S2 and an unlock signal S3 it has received, so that a verification sound having varied sound quality depending on which of lock and unlock of the door 2*c* is performed is produced.

(2) If a vehicle also has functions that require sound production in addition to the keyless entry function, the sound production controller 1 may output PWM signals with frequencies and duty ratios that differ among those functions. The present invention can also be applied to other sound production functions such as a trunk-open function, a dialog response function, and sounding during function mode switching, and smart alarms as well as the keyless entry function.

(3) In any of the illustrative aspects described above, the sound production controller 1 may output a PWM signal with a frequency that changes with time after receiving an operation signal such as a lock signal S2. In particular, a PWM signal whose frequency increases or decreases with time or a PWM signal whose frequency repeatedly changes between high and low values may be provided. With this, a verification sound whose frequency changes between high and low frequencies can be produced when a keyless entry function is performed, which is more distinguishable from the warning sound produced when a honk operation is performed.

(4) While the coil 8 and contact 9 connected with each other in series are provided that receive a direct-current signal S5' to cause vibration at a resonance frequency f1, thereby producing a warning sound in the vehicle horn device 3 in the illustrative aspects described above, the present invention is not so limited. A voice coil may be provided and a given alternating-current signal may be provided to the voice coil to cause vibration at a resonance frequency to produce a warning sound. In this case, a high-frequency AC signal with a frequency higher than that of the given AC signal can be provided to produce a verification sound with a higher frequency than that of the warning sound when a keyless entry function is performed.

(5) While the illustrative aspects have been described with respect to examples in which the present invention is applied to a vehicle horn device 3, the present invention is not limited to vehicle horn devices 3. For example, some vehicles include a security horn device that acts as an antitheft device producing a warning sound when an abnormal state is detected. Such a security horn device may be used to produce a sound at a frequency higher than the resonance frequency of the security horn device in response to execution of a function that requires sound production in a case other than cases where an abnormal state is detected.

What is claimed is:

1. A sound production controller provided in a vehicle comprising:
- a horn device including a vibrating part and a suspension that supports the vibrating part, wherein a mass of the vibrating part and a compliance of the suspension determine a predetermined resonance frequency, the horn device that performs a vibrating operation at the predetermined resonance frequency in response to a predetermined operation to produce a warning sound;
- an input section which receives a sound production command signal outputted in response to execution of a function that requires sound production in the vehicle other than the predetermined operation; and
- a sound production controller, wherein if the input section receives the sound production command signal, the sound production controller provides a high-frequency signal to the horn device, further wherein the high-frequency signal has a frequency higher than the predetermined resonance frequency.

2. A sound production controller provided in a vehicle comprising:
- a vehicle horn device including a vibrating part and a suspension that supports the vibrating part, wherein a mass of the vibrating part and a compliance of the suspension determine a predetermined resonance frequency, the vehicle horn device that performs a vibrating operation at the predetermined resonance frequency in response to a honk operation to produce a warning sound;
- an input section which receives a sound production command signal outputted in response to execution of a function that requires sound production in the vehicle other than the honk operation; and
- a sound production controller, wherein if the input section receives the sound production command signal, the sound production controller provides a high-frequency signal having a frequency higher than the predetermined resonance frequency to the vehicle horn device to cause the vehicle horn device to produce a sound.

3. The sound production controller according to claim 2, wherein the vehicle horn device includes a coil connected to a contact in series, further wherein the contact repeatedly opens and closes at the predetermined resonance frequency by receiving a predetermined direct-current signal in response to the honk operation to cause the vehicle horn device to perform a vibrating operation and produce the warning sound.

4. The sound production controller according to claim 3, wherein the sound production controller includes a switching element provided between a power supply and the vehicle horn device and a PWM signal generating section which generates a PWM signal that turns on and off the switching element, wherein if the input section receives the sound production command signal, the sound production controller turns on and off the switching element on the basis of the PWM signal to provide a high-frequency signal to the coil and contact at a level capable of holding the contact closed to cause the vehicle horn device to perform a vibrating operation in accordance with the duty ratio of the PWM signal.

5. The sound production controller according to claim 4, wherein the input section receives a honk operation signal in response to the honk operation in addition to the sound production command signal.

6. The sound production controller according to claim 5, wherein when the input section receives the honk operation signal, the PWM signal generating section generates a PWM signal having a duty ratio set to at least one of 0% or 100% to hold the switching element turned on to provide a direct-current signal at a level capable of opening the contact to the coil and the contact.

7. The sound production controller according to claim 6, wherein the input section receives a honk operation signal in response to the honk operation to cause the vehicle horn device to produce a warning sound, wherein if the input section receives both of the sound production command signal and the honk operation signal at a time, the sound production controller is structured to respond to the honk operation signal in preference to the sound production command signal to cause the vehicle horn device to produce the warning sound.

8. The sound production controller according to claim 2, wherein the sound production command signal is a command signal outputted in response to the vehicle locking or unlocking as performed by a remote controller.

9. The sound production controller according to claim 2, wherein the high-frequency signal is a signal whose frequency changes with time.

10. The sound production controller according claim 4, wherein the PWM signal is adjusted to have a duty ratio that causes the vehicle horn device to produce a sound with a sound volume that satisfies a predetermined value.

* * * * *